(12) United States Patent
Miyabe et al.

(10) Patent No.: US 7,756,375 B2
(45) Date of Patent: Jul. 13, 2010

(54) OPTICAL FIBER AND WAVEGUIDE

(75) Inventors: Ryo Miyabe, Tokyo (JP); Ryuichi Sugizaki, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 209 days.

(21) Appl. No.: 11/909,045

(22) PCT Filed: Mar. 20, 2006

(86) PCT No.: PCT/JP2006/305520
§ 371 (c)(1), (2), (4) Date: Sep. 18, 2007

(87) PCT Pub. No.: WO2006/098470
PCT Pub. Date: Sep. 21, 2006

(65) Prior Publication Data
US 2009/0052855 A1    Feb. 26, 2009

(30) Foreign Application Priority Data
Mar. 18, 2005    (JP) .............................. 2005-080294

(51) Int. Cl.
G02B 6/02 (2006.01)
G02B 6/036 (2006.01)
(52) U.S. Cl. .................. 385/127; 385/126; 385/144
(58) Field of Classification Search ......... 385/123–128, 385/144
See application file for complete search history.

(56) References Cited

U.S. PATENT DOCUMENTS

| | | | |
|---|---|---|---|
| 6,859,598 B2 * | 2/2005 | Hasegawa et al. | 385/127 |
| 6,901,197 B2 * | 5/2005 | Hasegawa et al. | 385/125 |
| 7,085,464 B2 | 8/2006 | Miyabe et al. | |
| 7,164,830 B2 | 1/2007 | Hiroishi et al. | |
| 7,174,078 B2 * | 2/2007 | Libori et al. | 385/125 |
| 7,228,040 B2 * | 6/2007 | Nakajima et al. | 385/125 |
| 7,280,730 B2 * | 10/2007 | Dong et al. | 385/126 |
| 2004/0052484 A1 * | 3/2004 | Broeng et al. | 385/125 |
| 2006/0213230 A1 | 9/2006 | Miyabe et al. | |
| 2009/0052855 A1 | 2/2009 | Miyabe et al. | |

FOREIGN PATENT DOCUMENTS

JP    3306847    5/2002

(Continued)

OTHER PUBLICATIONS

Hasegwa, T. et al.,"Novel Hole-assisted Lightguide Fiber Exhibiting Large Anomalous Dispersion and Low Loss Below 1 dB/km", Optical Fiber Communication Conference and Exhibit, vol. 4, pp. PD5-1-PD5-3, 2001.

(Continued)

*Primary Examiner*—Daniel Petkovsek
(74) *Attorney, Agent, or Firm*—Oblon, Spivak, McClelland, Maier & Neustadt, L.L.P.

(57) ABSTRACT

A core region is doped with an impurity. A first cladding region is formed in a layered structure around the core region, including a microstructure. A second cladding region is formed in a layered structure around the first cladding region, including a homogeneous material. A relative refractive-index difference $\Delta 1$ between the core region and the second cladding region is equal to or more than 0.4% and equal to or less than 1.0%.

26 Claims, 5 Drawing Sheets

FOREIGN PATENT DOCUMENTS

| | | |
|---|---|---|
| JP | 2002 323625 | 11/2002 |
| JP | 2004 220026 | 8/2004 |
| JP | 2004 226541 | 8/2004 |

OTHER PUBLICATIONS

Nishioka, D. et al.,"Development of a Holey Fiber with Ultra-low Bending Loss", Technical Report of IEICE, vol. 63, pp. 23-27, 2003.

U.S. Appl. No. 12/169,182, filed Jul. 8, 2008, Miyabe et al.
U.S. Appl. No. 11/791,855, filed May 30, 2007, Miyabe et al.
U.S. Appl. No. 11/815,243, filed Aug 1, 2007, Miyabe et al.
U.S. Appl. No. 11/908,975, filed Sep. 18, 2007, Miyabe et al.
U.S. Appl. No. 12/187,025, filed Aug. 6, 2008, Miyabe et al.
U.S. Appl. No. 12/406,483, filed Mar. 18, 2009, Miyabe et al.

* cited by examiner

OPTICAL FIBER AND WAVEGUIDE

TECHNICAL FIELD

The present invention relates to an optical fiber including a microstructure, and a waveguide employing the optical fiber.

BACKGROUND ART

In general, an optical fiber is composed of a core region and a cladding region. The core region is made of a silica glass of which a refractive index is increased by doping, for example, a germanium. The cladding region is made of a silica glass having a refractive index lower than that of the core region, which forms a layer surrounding a circumference of the core. Light propagates through the core region by a total reflection of the light at a boundary between the core region and the cladding region. Conventionally, a relative refractive index difference between the core region and the cladding region is at largest 3% to 4%.

On the other hand, in recent years, an optical fiber has been reported with which a large relative refractive-index difference can be obtained compared to the above structured optical fiber. For example, in Patent Document 1, it has been reported that an average refractive index of the cladding region can be greatly reduced by providing a microstructure such as a hole as a representative example in the glass of the cladding region, in a longitudinal direction. In other words, the optical fiber having such structure can dramatically increase an effective refractive index of the core region compared to the conventional optical fiber.

Given this situation, in recent years, an optical fiber having the microstructure has been a focus of constant attention, in which a hole or the like is formed in a surrounding area of the core region of an optical fiber having a refractive index profile structure equivalent to a typical single mode optical fiber (hereinafter, referred to as SMF). This optical fiber has an advantage in that the microstructure provided around the core region can increase the relative refractive-index difference between the core region and the cladding region, which cannot be achieved with an SMF, thereby making the macro-bending loss of the optical fiber extremely low.

For instance, it has been reported that the macro-bending loss against a small-diameter bending with a diameter of 15 mm could be lowered to 0.04 dB/m by adopting the microstructure (see, for example, Nonpatent Document 1). After that, there has been another report that the macro-bending loss could be further lowered up to below 0.01 dB/m (see, for example, Nonpatent Document 2). On the other hand, an optical fiber has been proposed, in which the macro-bending loss is lowered while maintaining a large mode field diameter (hereinafter, referred to as MFD) in view of connection with the conventional SMF (see, for example, Patent Document 2).

Patent Document 1: Japanese Patent No. 3306847

Nonpatent Document 1: T. Hasegawa, et al., Microoptics Conference (2003), K2

Nonpatent Document 2: Daizo Nishioka, et al., Shingaku Giho, OFT 2003-63, P. 23~

Patent Document 2: Japanese Patent Application Laid-Open No. 2004 220026

DISCLOSURE OF INVENTION

Problem to be Solved by the Invention

Such an optical fiber needs to be highly reliable and easy to handle. For example, the optical fiber with the MFD and the macro-bending loss as proposed in Patent document 1 is still insufficient for practical use.

The present invention is made in view of the above problem. An object of the present invention is to provide an optical fiber in which the macro-bending loss is lowered while the MFD is maintained large. Another object of the present invention is to provide a waveguide that includes the optical fiber and that is connectable to an SMF with a low loss and is capable of making the macro-bending loss low even when a bending portion having a small curvature radius is formed.

Means for Solving Problem

To solve the above problems and to achieve the object, an optical fiber according to a first aspect of the present invention includes a core region that is doped with an impurity; a first cladding region that is formed in a layered structure around the core region, which includes a microstructure; and a second cladding region that is formed in a layered structure around the first cladding region, which includes a homogeneous material. A relative refractive-index difference $\Delta 1$ between the core region and the second cladding region is equal to or more than 0.4% and equal to or less than 1.0%.

According to a second aspect of the present invention, a ratio of a total cross-sectional area of the microstructure of the first cladding region to a total cross-sectional area of the core region, the first cladding region, and the second cladding region is less than 20%.

According to a third aspect of the present invention, a cross-sectional shape of an arrangement of the microstructure of the first cladding region is two folds rotational symmetric with respect to a center axis.

According to a fourth aspect of the present invention, a cross-sectional shape of an arrangement of the microstructure of the first cladding region is six folds rotational symmetric with respect to a center axis.

According to a fifth aspect of the present invention, a cross-sectional shape of an arrangement of the microstructure of the first cladding region is four folds rotational symmetric with respect to a center axis.

According to a sixth aspect of the present invention, at least three of the microstructure are arranged on an identical circumference of a circle in a lateral cross section of the optical fiber.

According to a seventh aspect of the present invention, the microstructure is arranged on two or more circumferences of circles having different diameters.

According to an eighth aspect of the present invention, the core region includes a silica glass that is doped with at least one of germanium and phosphor.

According to a ninth aspect of the present invention, the second cladding region includes a pure silica glass.

According to a tenth aspect of the present invention, the second cladding region includes a fluorine-doped silica glass.

According to an eleventh aspect of the present invention, a material of the first cladding region other than the microstructure is substantially same as a material of the second cladding region.

According to a twelfth aspect of the present invention, the microstructure is a hole formed in parallel to a center axis of the optical fiber in a longitudinal direction.

According to a thirteenth aspect of the present invention, a propagating light having a predetermined wavelength is guided in a single mode.

According to a fourteenth aspect of the present invention, a propagating light having a wavelength equal to or longer than 1,500 nm is guided in a single mode.

According to a fifteenth aspect of the present invention, a propagating light having a wavelength equal to or longer than 1,250 nm is guided in a single mode.

According to a sixteenth aspect of the present invention, when A [μm] is a mode field diameter at a wavelength of 1,500 nm, and B [dB/m] is a bending loss with a bending of a curvature radius of 7.5 mm at a wavelength of 1,550 nm, $B \leq 1$ is satisfied, and the following Equation (1) is satisfied.

$$A \geq \log_{10} B + 9 \quad (1)$$

According to a seventeenth aspect of the present invention, A and B further satisfy the following Equation (2).

$$A \geq \log_{10} B + 10 \quad (2)$$

According to an eighteenth aspect of the present invention, A and B further satisfy the following Equation (3).

$$A \geq \log_{10} B + 11 \quad (3)$$

According to a nineteenth aspect of the present invention, A is 7 μm to 13 μm.

According to a twentieth aspect of the present invention, A is 7 μm to 12 μm.

According to a twenty-first aspect of the present invention, A is 7 μm to 11 μm.

According to a twenty-second aspect of the present invention, B is equal to or less than 0.1 dB/m.

According to a twenty-third aspect of the present invention, a bending loss with a bending of a curvature radius of 7.5 mm at a wavelength of 1,550 nm is equal to or less than 0.1 dB/m.

According to a twenty-fourth aspect of the present invention, a bending loss with a bending of a curvature radius of 5.0 mm at a wavelength of 1,550 nm is equal to or less than 0.1 dB/m.

According to a twenty-fifth aspect of the present invention, the microstructure is a hole, and the optical fiber further comprises a sealing member for sealing an internal space of the hole.

According to a twenty-sixth aspect of the present invention, the sealing member is an isolation wall provided on both ends of the hole.

According to a twenty-seventh aspect of the present invention, the sealing member is isolation walls provided at arbitrary intervals in a longitudinal direction to seal the hole by partitioning the hole into a plurality of portions.

According to a twenty-eighth aspect of the present invention, the sealing member is a refractive-index matching agent with filled in the hole at a connecting end portion, and another optical fiber is connected to the connecting end portion.

According to a twenty-ninth aspect of the present invention, the sealing member is formed by collapsing a connecting end portion the hole to put the hole in a sealed state, and another optical fiber is connected to the connecting end portion in the sealed state.

A waveguide according to a thirtieth aspect of the present invention includes the optical fiber according to any one of the first to the twenty ninth aspects of the present invention, with at least one place of bending with a curvature radius equal to or more than 3 mm and equal to or less than 60 mm.

EFFECT OF THE INVENTION

According to the present invention, it is possible to obtain an optical fiber in which the macro-bending loss is lowered while the MFD large is maintained large. Furthermore, it is possible to obtain a waveguide including the optical fiber that is connectable to an SMF with low loss and capable of making the macro-bending loss low even when a bending portion having a small curvature radius is formed.

EXPLANATIONS OF LETTERS OR NUMERALS

Figure 1:
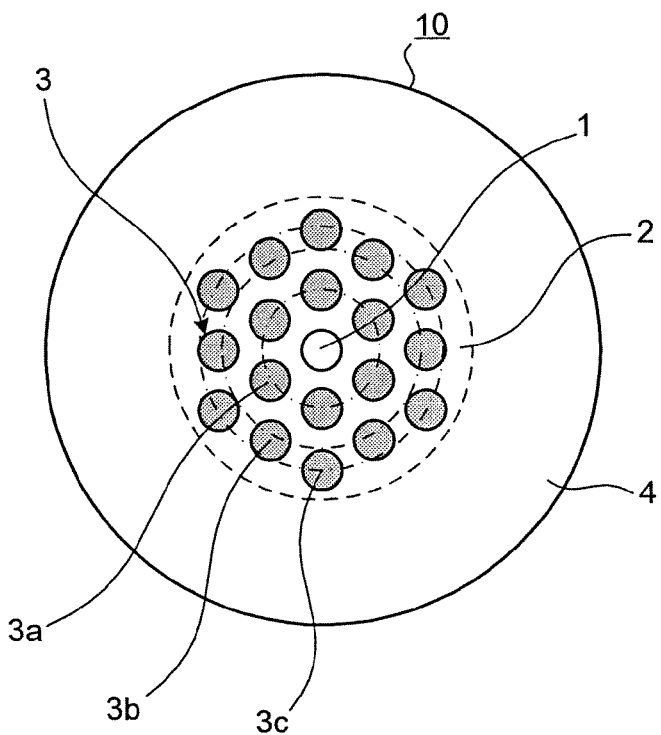
FIG. 1 is a lateral cross section of an optical fiber that is used in optical fiber Example 1-1.

1 Core region
2 First cladding region
3 Hole
4 Second cladding region
10, 20, 30, 40, 50 Optical fiber
60 Optical fiber to be connected
61 Core region
70 Optical fiber of backbone system
100 Obstacle
A, B Bending portion
C1, C2 Connecting portion

BEST MODE(S) FOR CARRYING OUT THE INVENTION

Exemplary embodiments of an optical fiber and a waveguide according to the present invention are explained in detail below with reference to the accompanying drawings. Note that the present invention is not limited to the embodiments. The schematic structural features of the optical fibers according to the present invention are explained in the embodiments, and then optical fibers and waveguides adapted for practical use are explained in detail in examples.

Embodiments

Conventionally, in an optical fiber including a core region, which is doped with an impurity, and a cladding region having a microstructure, a relative refractive-index difference Δ1 between the core region and the cladding region (second cladding region) without the microstructure is 0.3% to 0.39%, which is almost the same as that of an SMF. The relative refractive-index difference Δ1 of the optical fiber according to the embodiments is increased to 0.4% to 1.0%, thereby making the difference in refractive indexes between a core region and a cladding region large in comparison to conventional optical fibers. Accordingly, in comparison to optical fibers having conventional structures, light can be confined to the core region efficiently and the macro-bending loss occurred at in a bending portion of the optical fiber can be reduced. However, when Δ1 is too high, the difference in material properties between the core region and the cladding region becomes large. Specially, the difference in linear expansion coefficient between the core region and the cladding region becomes large, which leads to a problem in that distortion remaining in a drawn optical fiber becomes large, and thus, strength of the optical fiber decreases. If Δ1 is high and holes are formed as the microstructure by, for example, using an ultrasonic drill, a crack is generated in a glass preform easily during the process of making the holes. Accordingly, Δ1 is preferably equal to or less than 1.0%.

The relative refractive-index difference Δ1 is defined by the following Equation:

$$\Delta 1 = \{(n_{core} - n_{clad})/n_{core}\} \times 100\% \quad (4)$$

where $n_{core}$ is the maximum refractive index of the core region, and $n_{clad}$ is a refractive index of the second cladding region.

According to the optical fiber of the embodiments, the refractive index of the core region is larger than those of the conventional optical fibers. Therefore, the difference in average refractive indexes between the core region and the first cladding region can be made large even when the total cross-sectional area of the microstructure necessary for allowing the difference in the average refractive indexes between the core region and the first cladding region to be large is made small, or even when the number of the microstructures is reduced. Thus, an optical fiber having a low macro-bending loss can be obtained.

In a typical optical fiber, the MFD is reduced as the refractive index of the core region with respect to the cladding region increases. However, the structure of the optical fiber according to the present invention is such that the change of the MFD due to the increase of the refractive index of the core region is small because the MFD changes depending on the occupancy and the arrangement pattern of the microstructure. Such structure enables the optical fiber to have both of a low macro-bending loss and a large MFD.

The refractive index of the core region is made large, so that light can be confined more efficiently to the core region even when the microstructured portions are provided at positions distant from the core region in the cross section of the optical fiber. The microstructure provided near the core region in the cross section of the optical fiber can reduce the macro-bending loss. However, in the embodiments of the present invention, the macro-bending loss is low even when the distances between the core region and the microstructure are made slightly large. For example, when the microstructure is provided by forming holes in an optical fiber preform using an ultrasonic drill or the like, drilling operation can be performed at positions distant from the core region, which reduces the risk of generating a crack in the core region during the drilling operation.

When the region of the microstructure is more than 20% of the total area of the optical fiber, the strength of the optical fiber is deteriorated. Thus, the region of the microstructure is set equal to or less than 20%, thereby maintaining the strength of the optical fiber itself as glass. The cross-sectional area of the microstructure more than 20% is not preferable because the following problem occurs. When the optical fiber is drawn from the optical fiber preform, large stress is put on the glass portion near the microstructure in the optical fiber at a meniscus portion at which the optical fiber is drawn. This increases the possibility of breaking of the optical fiber.

An optical fiber of one embodiment according to the present invention has microstructure of two folds rotational symmetry with respect to the center axis of the optical fiber. Such structure causes anisotropy in the refractive index distribution between the X-axis direction and the Y-axis direction in the cross section of the optical fiber. The anisotropy between the X-axis direction and the Y-axis direction leads to an effect of maintaining a polarization plane of light to be guided. The microstructure having the two folds rotational symmetry are the microstructure rotationally symmetric with respect to the center axis under only two rotations, and do not include ones having four folds rotational symmetry, six folds rotational symmetry, and the like.

An optical fiber of another embodiment according to the present invention has microstructure of six folds rotational symmetry with respect to the center axis of the optical fiber. Such structure makes the refractive index of the cross section of the optical fiber relatively constant in a circumferential direction, thus reducing polarization mode dispersion.

An optical fiber of still another embodiment according to the present invention has a microstructure of four folds rotational symmetry with respect to the center axis of the optical fiber. Such structure makes the refractive index distribution in the X-axis direction and that in the Y axis the same, thus reducing polarization mode dispersion.

The Microstructure is arranged on two or more different concentric circles with respect to the center axis of the optical fiber. In this manner, a refractive index can be freely changed along the radial direction from the center axis of the optical fiber depending upon the arrangement pattern of the microstructure.

The method of doping the core region with germanium (Ge) and phosphorous (P) includes the VAD (Vapor-phase Axial Deposition) method. With this method, a doping amount can be finely adjusted. Consequently, the refractive index difference of the core region with respect to the cladding region can be adjusted on 0.01% basis.

The homogeneous material of the second cladding region is pure silica glass or fluorine-doped silica glass. The material of the first cladding region other than the microstructure is the same as that of the second cladding region. When the first cladding region does not include the microstructure, the refractive indexes of the first cladding region and the second cladding region are the same. The cladding region is composed of pure silica glass or fluorine-doped silica glass, which causes a refractive index difference with respect to the core region.

The microstructure is a hole, so that an average refractive index of the first cladding region can be greatly decreased. The holes can be made easily in an optical fiber preform in a longitudinal direction by using, for example, an ultrasonic drill. Hence, the microstructure can be manufactured at low cost in comparison to the case in which a liquid or a solid having a refractive index different from that of silica glass is inserted in the cladding region.

When light is transmitted in the single mode, a cut-off wavelength λc needs to be shorter than an operating wavelength. In the embodiments, the optical fiber can transmit light having a wavelength equal to or more than 1,500 nanometer (nm) in a single mode. Therefore, the optical fiber can be used for light having a wavelength band including a C band and an L band. Preferably, the optical fiber transmits light having a wavelength of equal to or more than 1,250 nm in a single mode. Such an optical fiber can be used for light of a broadband wavelength including an S band, the C band, the L band, an E band, and an O band.

The cut-off wavelength λc indicates the fiber cut-off wavelength λc defined by the ITU-T (International Telecommunication Union-Telecommunication Standardization Sector) G.650.1. As for the rest of terminologies not specifically defined in the specification, the definition and the measurement method by the ITU-T G.650.1 or G.650.2 will be applied.

The optical fiber of the embodiments can keep the macro-bending loss low even when the optical fiber includes the microstructure that increases the MFD. For example, the macro-bending loss of the optical fiber having the MFD of 8 micrometer (μm) at a wavelength of 1,550 nm is equal to or less than 0.01 dB/m. The relationship between these two properties of the optical fiber preferably satisfies Equation (1), and more preferably satisfies Equation (2) and Equation (3).

When light having a wavelength of 1,550 nm is transmitted, the MFD is 7 μm to 13 μm, preferably 7 μm to 12 μm, and more preferably 7 to 11 μm. It is assumed that the optical fiber of the embodiments is connected to, for example, an SMF having a MFD of about 10 μm. When the optical fiber of the embodiments has the MFD close to 10 μm, the loss by a mechanical splice can be reduced. When the optical fiber of the embodiments is fusion spliced to a standard single mode fiber, the MFDs of both optical fibers are close to each other. Thus, the loss due to the fusion splicing is low and fusion splicing operation can be performed easily.

When transmitting light has a wavelength of 1,550 nm, the macro-bending loss with respect to bending with a curvature radius of 7.5 millimeter (mm), more preferably 5.0 mm, is equal to or less than 0.1 dB/m. Because the optical loss with respect to the bending is low as described above, it is possible to install the optical fibers in an indoor local position or the like with a small curvature radius.

A wall is provided in each hole at both sides of the optical fiber so that it is possible to prevent contaminants from entering the holes. Whereby, increase of the transmission loss due to the contamination inside the holes can be suppressed.

In addition, by providing an isolation wall for prevention of contaminant entry at an arbitrary position in each hole, structural change in the cross section of the optical fiber in the longitudinal direction due to the provision of the isolation walls is small. Therefore, shape variation of the MFD during transmission of light can be small at the positions where the isolation walls are provided, and accordingly, the resultant transmission loss can be also lowered.

The holes in the end portions are filled with a refractive-index matching agent. Accordingly, the MFDs of the end portions of the optical fiber of the present invention and the SMF can be close to each other when the optical fiber of the present invention is connected to an SMF. Therefore, the connection loss caused when the optical fiber of the present invention is connected to an existing SMF waveguide can be kept low.

Conventional optical fibers are used as a light transmission material to be bent with a large curvature radius for making the macro-bending loss low. On the other hand, the optical fiber having the structure of the present invention causes an extremely low macro-bending loss. Therefore, even when the optical fiber according to the present invention is used in a light waveguide in a state of being bent with a curvature radius not smaller than 3 mm and not larger than 60 mm, the transmission loss is low. Thus, the optical fiber can be installed in, for example, an indoor narrow space.

EXAMPLE

FIG. 1 is a lateral cross section of an optical fiber that is used in optical fiber Example 1-1. In FIG. 1, an optical fiber 10 includes a core region 1, a first cladding region 2 formed as a layer around the core region 1, and a second cladding region 4 formed as a layer around the first cladding region 2. The first cladding region 2 has a plurality of holes 3 as the microstructure. The core region 1 is made of silica glass doped with germanium. The relative refractive-index difference of the core region 1 with respect to pure silica glass is 0.4%. On the other hand, the first cladding region 2 other than the holes 3 and the second cladding region 4 are made of pure silica glass. The holes 3 each penetrate through the optical fiber 10 in parallel along the center axis of the optical fiber 10 in the longitudinal direction. The rate of change of the cross section of the holes 3 along the center axis in the longitudinal direction is equal to or less than 10% in area ratio. An interval between adjacent holes 3 in the lateral cross section, i.e., a hole interval A, is 7.0 μm to 11.0 μm. The total cross-sectional area ratio of 18 holes 3 with respect to the cross-sectional area of the optical fiber is 8% to 17%.

As shown in FIG. 1, the 18 holes 3 are formed on three concentric circles with respect to the center of the optical fiber such that 6 holes 3 are located on each concentric circle. That is, holes 3a are located on the concentric circle closest to the center of the optical fiber, holes 3b are located on the second-closest concentric circle, and holes 3c are located on the third-closest concentric circle.

The characteristics of the optical fiber 10 are as follows. The MFD was 7.0 μm to 8.0 μm at a wavelength of 1,550 nm. The macro-bending loss with respect to bending with a curvature radius of 7.5 mm at a wavelength of 1,550 nm was 0.001 dB/m. The cut-off wavelength was 1,240 nm. The macro-bending loss with respect to a bending with a curvature radius of 5 mm at a wavelength of 1,550 nm was 0.07 dB/m.

The lateral cross-sectional shape of the holes 3 of the optical fiber 10 is such that the holes 3 are arranged to have six folds rotational symmetry with respect to the center axis. Such an arrangement pattern made polarization mode dispersion equal to or less than 0.5 ps/km$^{1/2}$.

Optical Fiber Example 1-2

In similar manner to optical fiber Example 1-1, an optical fiber was manufactured. The optical fiber includes the core region 1 that was doped with germanium so that the relative refractive-index difference of the core region 1 with respect to pure silica glass is 0.5% to 0.6%, and the cladding region (the first cladding region 2 and the second cladding region 4) having the cross-sectional structure shown in FIG. 1. The second cladding region 4 of the optical fiber in optical fiber Example 1-2 is made of pure silica glass. The hole interval Λ is 6.0 μm to 11.0 μm, and the total cross-sectional area ratio of 18 holes 3 with respect to the cross-sectional area of the optical fiber is 7% to 18%. The MFD of the optical fiber was 7.0 μm to 7.6 μm at a wavelength of 1,550 nm. The macro-bending loss with respect to bending with a curvature radius of 7.5 mm at a wavelength of 1,550 nm was 0.0003 dB/m. The cut-off wavelength was 1,450 nm to 1,490 nm. In addition, the macro-bending loss with respect to bending with a curvature radius of 5 mm at a wavelength of 1,550 nm was 0.018 dB/m.

Optical Fiber Example 1-3

An optical fiber was manufactured as follows. The first cladding region 2 having the microstructure shown in FIG. 1 is doped with fluorine such the relative refractive-index difference of the first cladding region 2 with respect to pure silica glass is −0.1%, and a doping amount of germanium to be doped in the core region 1 is adjusted such that the relative refractive-index difference of the core region 1 with respect to the second cladding region 4 is 0.4%. In this example also, it was confirmed that the cut-off wavelength, the MFD, and the macro-bending loss are almost the same as those in optical fiber Example 1-1.

Optical Fiber Example 2-1

Figure 2:
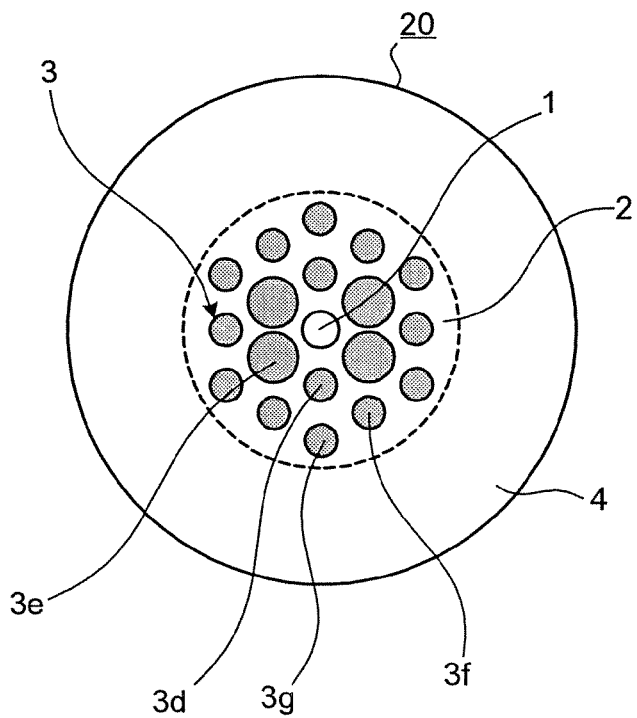
FIG. 2 is a lateral cross section of an optical fiber that is used in optical fiber Example 2-1.

FIG. 2 is a lateral cross section of an optical fiber that is used in optical fiber Example 2-1. In similar manner to the optical fiber 10 in optical fiber Example 1-1, the core region 1 of an optical fiber 20 shown in FIG. 2 is made of silica glass doped with germanium, and the first cladding region 2 other than the holes 3 and the second cladding region 4 are made of pure silica glass. The relative refractive-index difference of the core region 1 with respect to pure silica glass is 0.4%. In the optical fiber 20 shown in FIG. 2, the lateral cross-sectional shape of the holes 3 is such that the holes 3 are arranged to have two folds rotational symmetry. In other words, large holes $3e$ and small holes $3d$ formed on the concentric circle closest to the center have a line-symmetrical relation. Six small holes $3f$ are formed on the second-closest concentric circle, and six small holes $3g$ are formed on the third-closest concentric circle. The feature of the optical fiber 20 is as follows. When the direction of the longitudinal center axis is defined as the Z-axis direction, the refractive index distribution in the X-axis direction is largely different from that in the Y-axis direction in the cross section of the optical fiber, which leads to an effect of maintaining a polarization plane of light to be guided.

Optical Fiber Example 2-2

An optical fiber having the macrostructures shown in FIG. 2 was manufactured in the same manner as the optical fiber 10 in optical fiber Example 2-1. In similar manner to the optical fiber 10 in optical fiber Example 1-1, the core region 1 is made of silica glass doped with germanium, and the first cladding region 2 other than the holes 3 and the second cladding region 4 are made of pure silica glass. The relative refractive-index difference of the core region 1 with respect to pure silica glass is 0.82%. The interval between each large hole $3e$ and the core region 1 is equal to or less than 0.5 μm, i.e., the large holes $3e$ are located extremely close to the core region 1. Mode birefringence in this case was $4.0 \times 10^{-4}$.

Figure 3:
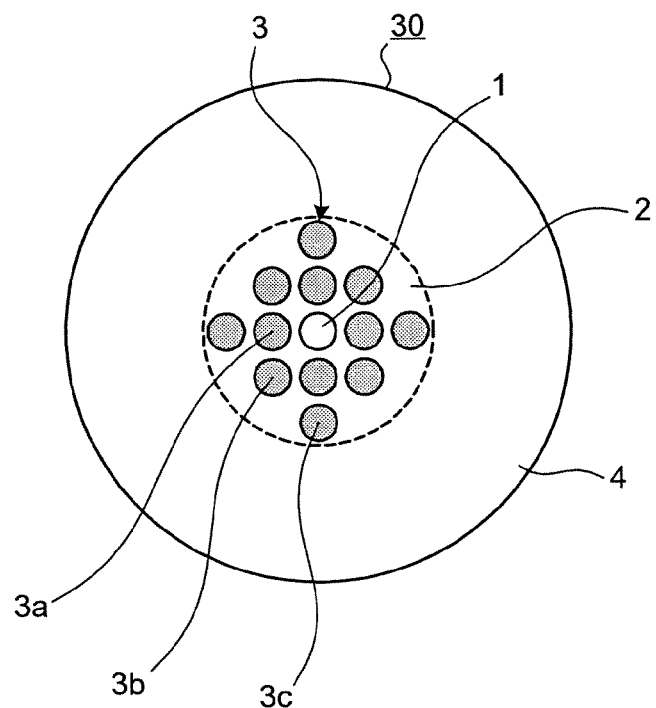
FIG. 3 is a lateral cross section of an optical fiber that is used in optical fiber Example 3-1.

FIG. 3 is a lateral cross section of an optical fiber that is used in optical fiber Example 3-1. In similar manner to the optical fiber 10 in optical fiber Example 1-1, the core region 1 of an optical fiber 30 shown in FIG. 3 is made of silica glass doped with germanium, and the first cladding region 2 other than the holes 3 and the second cladding region 4 are made of pure silica glass. The relative refractive-index difference of the core region 1 with respect to pure silica glass is 0.4%. In the optical fiber 30, the holes 3 are arranged to have four-fold rotational symmetry with respect to the center axis as shown in FIG. 3. Specifically, four holes $3a$ are arranged on the concentric circle closest to the center, four holes $3b$ are arranged on the second concentric circle at positions determined by rotating 45 degrees from the holes $3a$, and four holes $3c$ are arranged on the third concentric circle at positions determined by rotating another 45 degrees on radial lines of the holes $3a$ with respect to the center. In the optical fiber 30 having such an arrangement pattern, polarization mode dispersion was equal to or less than $0.2 \text{ ps/km}^{1/2}$.

Optical Fiber Example 4-1

Figure 4:
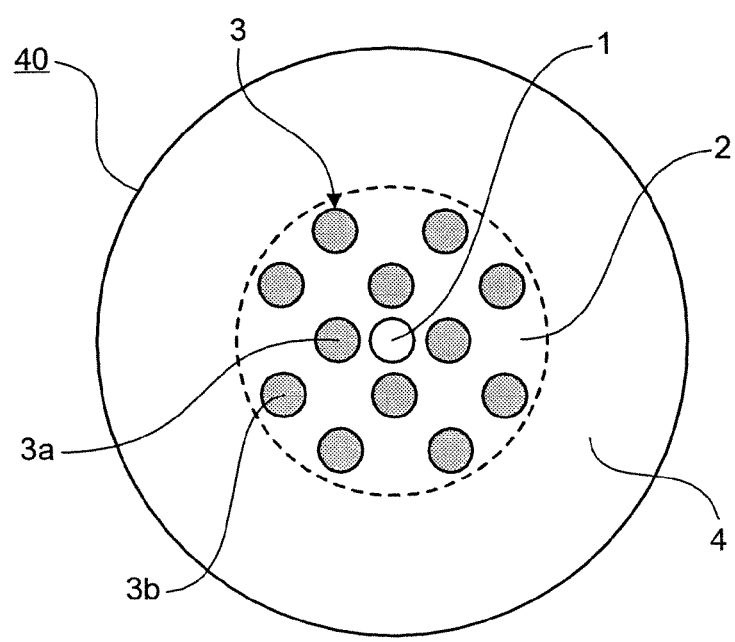
FIG. 4 is a lateral cross section of an optical fiber that is used in optical fiber Example 4-1.

FIG. 4 is a lateral cross section of an optical fiber in optical fiber Example 4-1. An optical fiber 40 shown in FIG. 4 includes the core region 1, the first cladding region 2 formed as a layer around the core region 1, and the second cladding region 4 formed as a layer around the first cladding region 2. The first cladding region 2 has the holes 3 as the microstructured portions. The core region 1 is made of silica glass doped with germanium. Two types of optical fibers were manufactured in this example. The relative refractive-index differences Δ1 of the core region 1 with respect to pure silica glass in the two optical fibers are 0.42% and 0.45%. The diameters of the core region 1 of the two optical fibers are both 7.4 μm. On the other hand, the first cladding region 2 other than the holes 3 and the second cladding region 4 are made of pure silica glass. The holes 3 penetrate through the optical fiber 40 and are parallel to the center axis of the optical fiber 40 in the longitudinal direction. The rate of change of the cross section of the holes 3 along the center axis in the longitudinal direction is equal to or less than 5% in area ratio. The total cross-sectional area ratio of 12 holes 3 with respect to the cross-sectional area of the optical fiber is 8.67%.

The holes 3 each have an approximately round shape in the cross section of the optical fiber 40, and have the same cross-sectional area. The diameter d of each of the holes 3 is 6.8 μm. Four holes $3a$ are arranged on the concentric circle closest to the center of the first cladding region 2, and the distance (L1) between the center of each of the holes $3a$ and the center of the cross section of the optical fiber is 7.7 μm. The holes $3a$ are arranged to have four folds rotational symmetry. There are 8 holes $3b$ arranged in the outer portion of the first cladding region 2 with respect to the center of the optical fiber 40. The distance (L2) between the center of each of the holes $3b$ and the center of the cross section of the optical fiber 40 is 16.435 μm, and each of the holes $3b$ is positioned on the extended line connecting two adjacent holes $3a$ arranged in the inner portion of the first cladding region 2.

The method of manufacturing the optical fiber shown in this example is as follows. First, silica glass including a core region doped with germanium by the VAD method was manufactured. Next, a pure silica layer was formed on the outer surface of the silica glass by the OVD method. With the above steps, a preform having an outer diameter of 40 mm and a core diameter of 3.7 mm was manufactured. The preform was drilled using a mechanical drill to form holes each having a finishing diameter of 3.4 mm, and the surface of the inner wall of each hole was polished. Then, the preform was drawn to be an optical fiber with a cladding diameter of 80 μm. The characteristics of optical fibers Sample. 1 and Sample. 2 manufactured by the above method are shown in Table 1.

TABLE 1

|  | Δ1 % | d μm | Cut-off wave-length nm | Macro-bending loss r = 7.5 mm @1550 nm dB/m | Macro-bending loss r = 5 mm @1550 nm dB/m | MFD @1550 nm μm |
|---|---|---|---|---|---|---|
| Sample. 1 | 0.42 | 6.8 | 1350 | 0.001 | 0.0093 | 7.05 |
| Sample. 2 | 0.45 | 6.8 | 1420 | 0.0005 | 0.0044 | 7.02 |

The cut-off wavelengths were 1,350 nm and 1,420 nm, and light in a wavelength band of 1.55 μm (1,530 nm to 1,565 nm) is transmitted in a single mode. The MFDs were equal to or more than 7.0 μm at a wavelength of 1,550 nm, and the connection losses are low when the optical fibers each mechanically connected to a standard SMF. Nonlinear phenomena occurring in the optical fibers can also be kept low. The macro-bending losses with respect to bending with a curvature radius of 5 mm at a wavelength of 1,550 nm were equal to or less than 0.01 dB/m, which indicates that an amount of loss increase caused by a small bending is extremely low. As described above, the lateral cross-sectional shape of the holes 3 in the optical fiber 40 is such that the holes 3 are arranged to have four folds rotational symmetry. Polarization mode dispersion was equal to or less than 0.1 ps/km$^{1/2}$.

Optical Fiber Example 4-2

Optical fibers having the following structure were examined by simulation. The optical fibers each have the structure in which holes are arranged in the cross section of the optical fiber as the microstructure that is similar to those in optical fiber Example 4-1. Note that it was confirmed that the result of the simulations of the optical fibers Sample. 1 and Sample. 2 actually manufactured in optical fiber Example 4-1 shows almost the same characteristics as those of the actually manufactured optical fibers.

Optical fibers Sample. 3, Sample. 4, and Sample. 5 were examined, and the characteristics thereof are shown in Table 2. The optical fibers Sample. 3, Sample. 4, and Sample. 5 each have the core diameter and the hole positions in the cross section same as those in optical fiber Example 4-1, but have a smaller hole diameter d compared to that in optical fiber Example 4-1.

TABLE 2

|  | Δ1 % | d μm | Cut-off wave-length nm | Macro-bending loss r = 7.5 mm @1550 nm dB/m | Macro-bending loss r = 5 mm @1550 nm dB/m | MFD @1550 nm μm |
|---|---|---|---|---|---|---|
| Sample. 3 | 0.42 | 6.4 | 1320 | 0.0037 | 0.0369 | 7.07 |
| Sample. 4 | 0.45 | 6.4 | 1380 | 0.0016 | 0.0183 | 7.04 |
| Sample. 5 | 0.41 | 6.0 | 1250 | 0.0097 | 0.092 | 7.11 |

The hole diameter was made small so that the cut-off wavelength was shifted to the side of a short wavelength. Specially, the cut-off wavelength of Sample. 5 was 1250 nm, thus light in a wavelength band of 1.3 μm (1280 nm to 1330 nm) is transmitted in a single mode. The MFDs became slightly large, but the macro-bending losses were slightly deteriorated. However, loss increase caused by bending the optical fiber to have a radius curvature of 5 mm was equal to or less than 0.1 dB/m in any sample, which indicates that the optical fiber of any sample has a structure adaptable enough to a small bending. The outer diameter of each optical fiber is 80 μm same as that in optical fiber Example 4-1, and the total cross-sectional area ratio of 12 holes 3 with respect to the cross-sectional area of the optical fiber is 7.68%.

Optical Fiber Example 4-3

An optical fiber Sample. 6 is examined by a simulation. The optical fiber Sample. 6 includes a microstructure similar to that in the optical fiber Example 4-1 shown in FIG. 4. The relative refractive-index difference Δ1 of the core region with respect to the cladding region is 0.7%, which is higher than that in optical fiber Example 4-1. The core diameter is 7 μm. The distance L1 between the center of each of the holes 3a positioned at the inner side and the center of the core region is 9 μm. The distance L2 between the center of each of the holes 3b positioned at the outer side and the center of the core region is 23 μm. In the examination, the diameter d (i.e., hole diameter) of each of the holes 3 is 9.0 μm, the outer diameter of the optical fiber is 80 μm, and the total cross-sectional area ratio of 12 holes 3 with respect to the cross-sectional area of the optical fiber is 15.18%. The result of the examination is shown in Table 3.

TABLE 3

|  | Δ1 % | d μm | Cut-off wave-length nm | Macro-bending loss r = 7.5 mm @1550 nm dB/m | Macro-bending loss r = 5 mm @1550 nm dB/m | MFD @1550 nm μm |
|---|---|---|---|---|---|---|
| Sample. 6 | 0.7 | 9 | 1470 | <10$^{-7}$ | <10$^{-5}$ | 6.47 |

As shown in Table 3, the cut-off wavelength was 1,470 nm, thus light in a wavelength band of 1.55 μm (1,530 nm to 1,565 nm) is transmitted in a single mode. The MFD was slightly small compared to those in Samples. 1 to 5. However, the macro-bending loss with respect to bending with a curvature radius of 5 mm at a wavelength of 1,550 nm was equal to or less than 1×10$^{-5}$ dB/m, which is extremely low.

Optical Fiber Example 4-4

Optical fibers Sample. 7 and Sample. 8 were examined by simulation. In the optical fibers Sample. 7 and Sample. 8, the positions and the diameter of the holes are changed from the samples in optical fiber Example 4-1 shown in FIG. 4. The core diameter is 7.4 μm. The distance L1 between the center of each of the holes 3a positioned at the inner side and the center of the core region is 11 μm. The distance L2 between the center of each of the holes 3b positioned at the outer side and the center of the core region is 22 μm. In the examination, the diameter d (i.e., hole diameter) of each of the holes 3 is 9.3 μm, the outer diameter of the optical fiber is 80 μm, and the total cross-sectional area ratio of 12 holes 3 with respect to the cross-sectional area of the optical fiber is 16.20%. The result of the examination is shown in Table 4.

TABLE 4

|  | Δ1 % | d μm | Cut-off wavelength nm | Macro-bending loss r = 7.5 mm @1550 nm dB/m | MFD @1550 nm μm |
|---|---|---|---|---|---|
| Sample. 7 | 0.42 | 9.3 | 1490 | 0.0082 | 8.3 |
| Sample. 8 | 0.43 | 9.3 | 1500 | 0.0095 | 8.29 |

The cut-off wavelengths were equal to or less than 1,550 nm, and the macro-bending losses were sufficiently low. Therefore, the optical fibers Sample. 7 and Sample. 8 have characteristics to fully function as an optical fiber flexible in bending. The MFDs were equal to or more than 8.0 μm. Each of the optical fibers can be mechanically connected to a standard SMF with low connection loss because the difference between MFDs of the SMF and each of the optical fibers is extremely small. The MFDs of the optical fibers were increased so that the nonlinearlity can be greatly suppressed compared to the optical fibers in optical fiber Example 4-1.

Optical Fiber Example 4-5

An optical fiber was manufactured as follows. The first cladding region 2 having the microstructure shown in FIG. 4 is doped with fluorine so that the relative refractive-index difference of the first cladding region 2 with respect to pure silica glass is −0.1%, and a doping amount of germanium to be doped in the core region 1 is adjusted so that the relative refractive-index difference of the core region 1 with respect to the second cladding region 4 is 0.42%. In this example also, it was confirmed that the cut-off wavelength, the MFD, and the macro-bending loss are almost the same as those of Sample. 1 in optical fiber Example 4-1.

Optical Fiber Example 5-1

Figure 5:
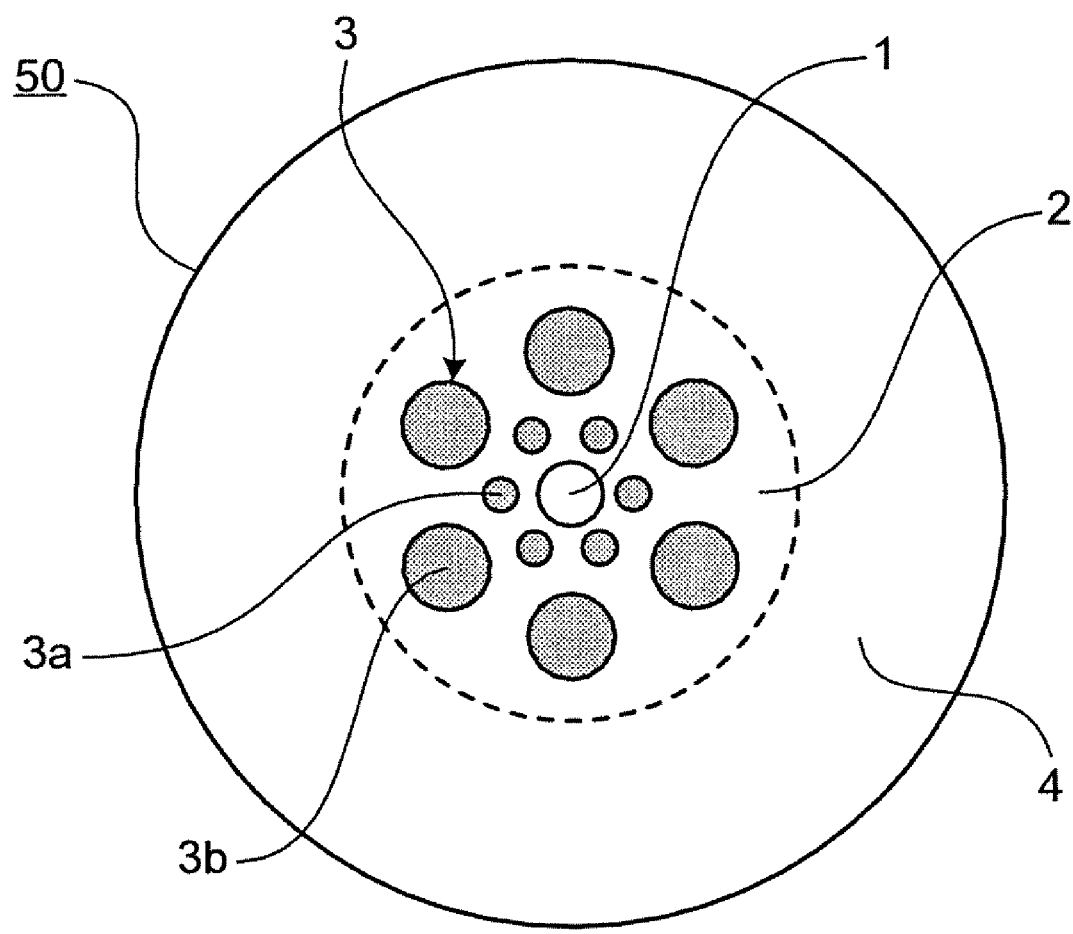
FIG. 5 is a lateral cross section of an optical fiber that is used in optical fiber Example 5-1.

FIG. 5 is a lateral cross section of an optical fiber in optical fiber Example 5-1. Similarly to the optical fiber 10, an optical fiber 50 shown in FIG. 5 includes the core region 1, the first cladding region 2 formed as a layer around the core region 1, and the second cladding region 4 formed as a layer around the first cladding region 2. The first cladding region 2 has the holes 3 as the microstructured portions. The core region 1 is made of silica glass doped with germanium. Two types of optical fibers were manufactured in this example. The relative refractive-index differences Δ1 of the core region 1 of the two optical fibers with respect to pure silica glass are 0.42% and 0.45%. The diameters of the core region 1 of the two optical fibers are 7.4 μm. On the other hand, the first cladding region 2 other than the holes 3 and the second cladding region 4 are made of pure silica glass. The holes 3 penetrate through the optical fiber 50 and are parallel to the center axis of the optical fiber 50 in the longitudinal direction. The rate of change of the cross section of the holes 3 along the center axis in the longitudinal direction is equal to or less than 5% in area ratio. The total cross-sectional area ratio of the 12 holes 3 with respect to the cross-sectional area of the optical fiber 50 is 5.7%.

The cross-sectional shape of each of the holes 3 arranged in the first cladding region 2 is a substantially perfect circle. In FIG. 5, holes 3a are arranged in the inner portion of the internal region of the first cladding region 2, and holes 3b are arranged in the outer portion of the internal region of the first cladding region 2. The holes 3a each have a relatively small cross-sectional area with a diameter d1 of 3 μm, and the holes 3b each have a relatively large cross-sectional area with a diameter d2 of 7.2 μm. The holes having the same diameter are located on the circumference of the same concentric circle. The distance L1 between the center of the hole having the relatively small cross-sectional area and the center of the cross-section of the optical fiber is 6 μm. The interval between the centers of adjacent holes having the relatively small cross-sectional area is 6 μm. The distance L2 between the center of the hole having the relatively large cross-sectional area and the center of the cross-section of the optical fiber is 13.15 μm. The interval between the centers of adjacent holes having the relatively large cross-sectional area is 13.15 μm. The holes having the same diameter are arranged to have six folds rotational symmetry with respect to the center of the cross section of the optical fiber. The positional relation between the holes (6 holes 3a) having the relatively small cross-sectional area and the holes (6 holes 3b) having the relatively large cross-sectional area is such that adjacent holes 3a and 3b satisfies the following condition. The line connecting the center of the cross section of the optical fiber and the center of the hole (center of the lateral cross section of the hole 3a) arranged in the inner portion of the internal region of the first cladding region 2, and the line connecting the center of the cross section of the optical fiber and the center of the hole (center of the lateral cross section of each of the holes 3b) arranged in the outer portion of the internal region of the first cladding region 2, form an angle of 30 degrees. The method of manufacturing the optical fiber 50 is the same as that in optical fiber Example 1-1, and the characteristics of the actually manufactured Sample. 9 and Sample. 10 are shown in Table 5.

TABLE 5

|  | Δ1 % | Cut-off wavelength Nm | Macro-bending loss r = 7.5 mm @1550 nm dB/m | Macro-bending loss r = 5 mm @1550 nm dB/m | MFD @1550 nm μm |
|---|---|---|---|---|---|
| Sample. 9 | 0.42 | 1380 | 0.013 | 0.0706 | 7.04 |
| Sample. 10 | 0.45 | 1400 | 0.0066 | 0.0386 | 7.01 |

The cut-off wavelengths were 1,380 nm and 1,400 nm, thus light in a wavelength band of 1.55 μm (1,530 nm to 1,565 nm) is transmitted in a single mode. The MFDs were equal to or more than 7.0 μm at a wavelength of 1,550 nm, and the connection losses were low when the optical fibers Sample. 9 and Sample. 10 each are mechanically connected to a standard SMF. Nonlinear phenomena occurring in the optical fibers can also be kept low. The macro-bending losses with respect to bending with a curvature radius of 7.5 mm at a wavelength of 1,550 nm were equal to or less than 0.1 dB/m, which indicates that the optical fibers are fully suitable for a condition in which an optical fiber is bent in a small diameter. As described above, the cross-sectional shapes of the holes 3a and the holes 3b in the optical fiber 50 are such that the holes 3a are arranged to have six folds rotational symmetry and the holes 3b are arranged to have six folds rotational symmetry. Polarization mode dispersion was equal to or less than 0.3 ps/km$^{1/2}$.

The optical fibers used in optical fiber Examples 1 to 5 were heated at both end portions thereof to melt the cladding regions and the holes were collapsed, thereby forming isolation walls. In addition, isolation walls were formed by selectively heating the holes at arbitrary positions in the longitudinal direction of the optical fibers in the same manner. Whereby, it is possible to prevent contaminants or the like from entering the holes.

Optical Fiber Connection Example

The following three methods were used for connecting the optical fiber 10 in optical fiber Example 1-1 shown in FIG. 1 and an SMF (optical fiber complying with the ITU G.652; hereinafter, referred to as an "optical fiber to be connected 60"). In the optical fiber 10, the MFD was about 7 μm to 8 μm at a wavelength of 1,550 nm. In the SMF, the MFD is 10.4 μm at a wavelength of 1,550 nm. The connection loss at the connecting portion during transmission of light having a wavelength of 1,550 nm was measured.

Connection Example 1

Figure 6:
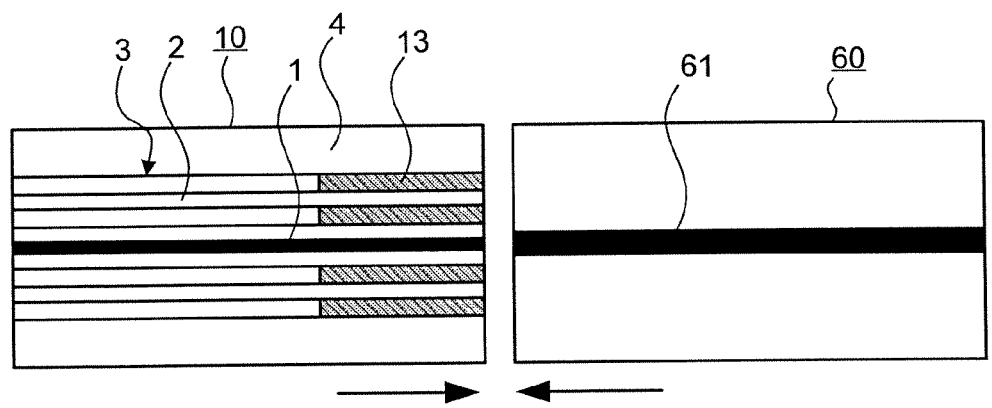
FIG. 6 is a longitudinal cross section for explaining a method of connecting optical fibers according to Connection Example 1.

FIG. 6 is a longitudinal cross section for explaining a method of connecting optical fibers according to Connection Example 1. In Connection Example 1, the spaces of the holes 3 were filled with a refractive-index matching agent 13 at the end portion of the optical fiber 10. Thereafter, the end portion of the optical fiber 10 with the spaces of the holes filled with the refractive-index matching agent 13 was connected to an end portion of the optical fiber to be connected 60 in a manner that the center axis of the core region 1 is brought in line with the center axis of the core region 61. The refractive-index matching agent 13 is grease having high viscosity with a refractive index of about 1.44 with respect to light having a wavelength of 1,550 nm.

By filling the holes of the optical fiber 10 with the refractive-index matching agent 13, the refractive index of the first cladding region 2 became close to that of the second cladding region 4 at the end portion of the optical fiber 10. Accordingly, the MFD of the optical fiber 10 increases, and became close to the MFD of the optical fiber to be connected 60. Furthermore, because the refractive index of the cladding region became substantially uniform at the connecting end portion of the optical fiber 10, a connection loss caused by a Fresnel reflection can be reduced. The connection loss at the connecting end portion of the optical fiber was measured to be equal to or less than 0.1 decibel (dB).

Connection Example 2

Figure 7:
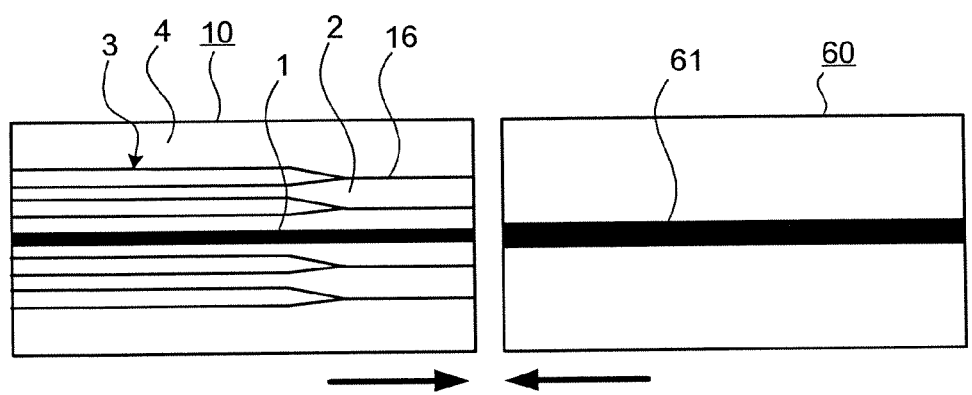
FIG. 7 is a longitudinal cross section for explaining a method of connecting optical fibers according to Connection Example 2.

FIG. 7 is a longitudinal cross section for explaining a method of connecting optical fibers according to Connection Example 2. In Connection Example 2, the holes 3 were collapsed at the end portion of the optical fiber 10 by heating, and the optical fiber 10 and the optical fiber to be connected 60 were connected in such a manner that the center axis of the core region 1 is brought in line with the center axis of the core region 61.

Sealed regions 16 were formed by collapsing the holes 3, whereby the refractive index of the first cladding region 2 became substantially equal to that of the second cladding region 4 at the end portion of the optical fiber 10. Therefore, the effect same as that of Connection Example 1 could be obtained. The connection loss at the connecting end portion was reduced compared to a case in which the optical fiber 10 is connected to the optical fiber to be connected 60 without performing any treatment to the end portion of the optical fiber 10. The connection loss at the connecting end portion of the optical fiber was measured similarly to Connection Example 1. The connection loss was equal to or less than 0.1 dB.

Connection Example 3

The optical fiber 10 was fusion spliced to the optical fiber to be connected 60 while the holes are collapsed at the end portion of the optical fiber 10 as described in Connection Example 2. Regarding the fusion condition, if a high power is abruptly discharged, each of the holes is expanded and can disrupt, which causes the cavity or the defect portion at the fusion-spliced portion. Therefore, in Connection Example 3, a discharging power was set to be extremely low, a discharging time was set to be long, and the fusion splicing was performed by gradually collapsing the holes.

Similarly to the above connection examples, the refractive index distribution at the connecting portion became substantially uniform. The MFD at the connecting portion was enlarged, and became close to the MFD of the optical fiber to be connected. The fusion splicing of the optical fibers causes germanium doped in the core regions of the optical fibers mutually diffused, so the MFDs of the optical fibers at the connecting portions became close to each other compared to Connection Example 1 and Connection Example 2, thus making the connection loss lower. The connection loss at the connecting end portion of the optical fiber in Connection Example 3 was measured similarly to the above connection examples. The connection loss was equal to or less than 0.05 dB.

Optical Fiber Usage Example

Figure 8:
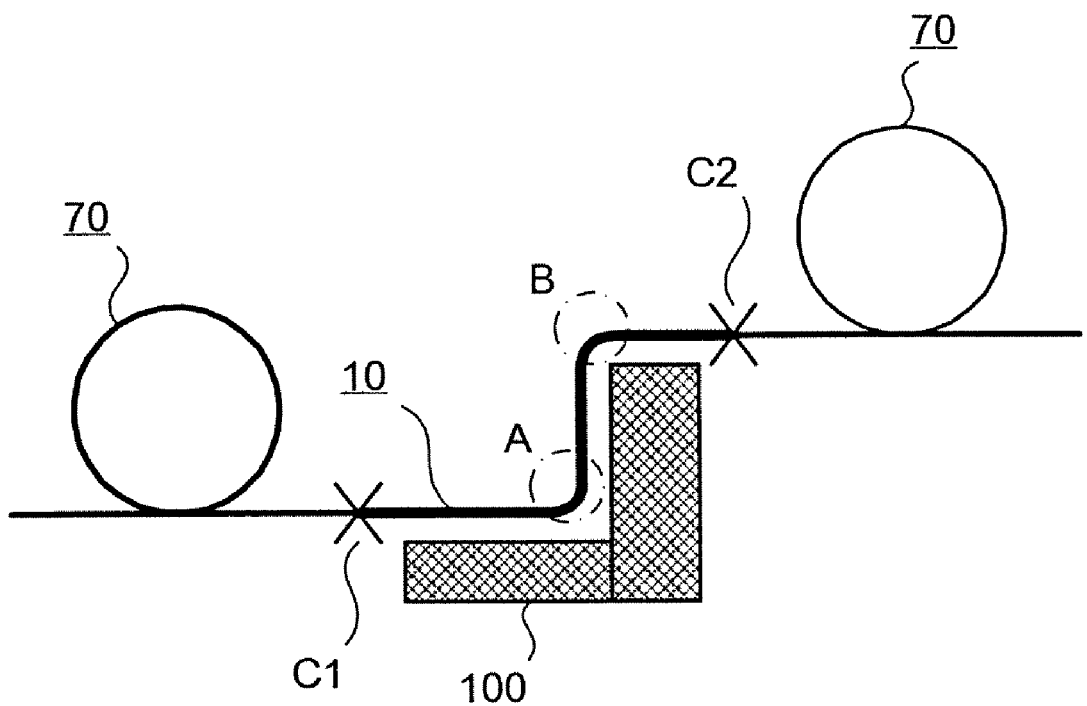
FIG. 8 is a schematic diagram for explaining an example in which the optical fiber according to an example is used in a waveguide.

FIG. 8 is a diagram for explaining an example in which the optical fiber according to the embodiments is used in a waveguide. In FIG. 8, the optical fiber 10 shown in [optical fiber Example 1] is connected to optical fibers 70 and 70 of the backbone system complying with G. 652 at both connecting portions C1 and C2 at the front and back ends. This usage example takes the case where the optical fiber 10 needs to be bent at a right angle at two places in the system due to an obstacle 100. The optical fiber 10 is bent with a curvature radius of 5 mm at each of bending portions A and B.

When only the optical fiber 70 of the backbone system was laid in the system shown in FIG. 8, a large macro-bending loss in the amount of about 10 dB occurred at each of the bending portions A and B. Therefore, the total transmission loss of light became considerably high in the whole backbone system.

However, use of the optical fiber 10 at the obstacle 100 as shown in FIG. 8 could suppress the macro-bending loss occurred at the bending portions A and B to be significantly low, and the macro-bending loss occurred at this time was equal to or less than 0.1 dB. The MFD of the optical fiber 10 was larger than conventional optical fibers which have holes and are strong against bending, and the macro-bending loss occurred at one connecting portion was equal to or less than 0.1 dB when the methods of the above connection examples were used. Consequently, the transmission loss in the whole backbone system could be suppressed to be extremely low compared to the case of only installing optical fiber of the backbone system.

As described above, the optical fiber and the waveguide according to the present invention are effective when being used as an optical fiber cable in the system having a bending portion, and especially are most suitable for an optical fiber cable such as a drop optical fiber cable which is used, for example, for installing an optical fiber cable in an office, a home, or a mansion, an indoor optical fiber cable, and an optical fiber cable for indoor wiring.

INDUSTRIAL APPLICABILITY

As described above, the optical fiber and the waveguide according to the present invention are effective for achieving both of the reduction of the connection loss occurred when connecting to an SMF and the reduction of the macro-bending loss occurred when a small bending is formed, and especially are suitable for various optical fiber cables such as a drop optical fiber which is used, for example, for installing an optical fiber cable in an office, a home, or a mansion, an indoor optical fiber cable, and an optical fiber cable for indoor wiring, and a waveguide formed by using the various optical fiber cables.

The invention claimed is:

1. An optical fiber, comprising:
   a core region that is doped with an impurity;
   a first cladding region that is formed in a layered structure around the core region, the first cladding region including a plurality of microstructures positioned on three concentric circles around the core region, the plurality of microstructures including a first microstructure positioned on one of the three concentric circles closest to the center of the core region and having a first cross-sectional area, and a second microstructure positioned on the one of the three concentric circles closest to the center of the core region and having a second cross-sectional area smaller than the first cross-sectional area, the first microstructure and second microstructure being in line symmetry, the rest of the plurality of the microstructures, those not on the one of the three concentric circles closest to the center of the core region, having a cross-sectional area substantially equal to the second cross-sectional area; and
   a second cladding region that is formed in a layered structure around the first cladding region, the second cladding region including a homogeneous material, wherein
   a relative refractive-index difference $\Delta 1$ between the core region and the second cladding region is equal to or more than 0.4% and less than 1.0%.

2. The optical fiber according to claim 1, wherein a ratio of a total cross-sectional area of the plurality of microstructures of the first cladding region to a total cross-sectional area of the core region, the first cladding region, and the second cladding region is less than 20%.

3. The optical fiber according to claim 1, wherein the core region includes a silica glass that is doped with at least one of germanium and phosphor.

4. The optical fiber according to claim 1, wherein the second cladding region includes a pure silica glass.

5. The optical fiber according to claim 1, wherein the second cladding region includes a fluorine-doped silica glass.

6. The optical fiber according to claim 1, wherein a material of the first cladding region other than the plurality of microstructures is substantially same as a material of the second cladding region.

7. The optical fiber according to claim 1, wherein the plurality of microstructures include a hole formed in parallel to a center axis of the optical fiber in a longitudinal direction.

8. The optical fiber according to claim 1, wherein a propagating light having a predetermined wavelength is guided in a single mode.

9. The optical fiber according to claim 1, wherein a propagating light having a wavelength equal to or longer than 1,500 nanometers is guided in a single mode.

10. The optical fiber according to claim 1, wherein a propagating light having a wavelength equal to or longer than 1,250 nanometers is guided in a single mode.

11. The optical fiber according to claim 1, wherein when A [micrometer] is a mode field diameter at a wavelength of 1,500 nanometers, and B [dB/m] is a bending loss with a bending of a curvature radius of 7.5 millimeters at a wavelength of 1,550 nanometers, $B \leq 1$ is satisfied, and $A \leq \log_{10} B + 9$ is satisfied.

12. The optical fiber according to claim 11, wherein A and B further satisfy $A \geq \log_{10} B + 10$.

13. The optical fiber according to claim 11, wherein A and B further satisfy $A \geq \log_{10} B + 11$.

14. The optical fiber according to claim 11, wherein A is 7 micrometers to 13 micrometers.

15. The optical fiber according to claim 11, wherein A is 7 micrometers to 12 micrometers.

16. The optical fiber according to claim 11, wherein A is 7 micrometers to 11 micrometers.

17. The optical fiber according to claim 11, wherein B is equal to or less than 0.1 dB/m.

18. The optical fiber according to claim 1, wherein a bending loss with a bending of a curvature radius of 7.5 millimeters at a wavelength of 1,550 nanometers is equal to or less than 0.1 dB/m.

19. The optical fiber according to claim 1, wherein a bending loss with a bending of a curvature radius of 5.0 millimeters at a wavelength of 1,550 nanometers is equal to or less than 0.1 dB/m.

20. The optical fiber according to claim 1, wherein
    the plurality of microstructures include a hole, and
    the optical fiber further comprises a sealing member for sealing an internal space of the hole.

21. The optical fiber according to claim 20, wherein the sealing member is an isolation wall provided on both ends of the hole.

22. The optical fiber according to claim 20, wherein the sealing member is isolation walls provided at arbitrary intervals in a longitudinal direction to seal the hole by partitioning the hole into a plurality of portions.

23. The optical fiber according to claim 20, wherein
    the sealing member is a refractive-index matching agent filled in the hole at a connecting end portion, and
    another optical fiber is connected to the connecting end portion.

24. The optical fiber according to claim 20, wherein
    the sealing member is formed by collapsing a connecting end portion of the hole to put the hole in a sealed state, and
    another optical fiber is connected to the connecting end portion in the sealed state.

25. The optical fiber according to claim 1, wherein the three concentric circles have different diameters.

26. A waveguide, comprising:
    an optical fiber, wherein the optical fiber includes
    a core region that is doped with an impurity;
    a first cladding region that is formed in a layered structure around the core region, the first cladding region including a plurality of microstructures positioned on three concentric circles around the core region, the plurality of microstructures including a first microstructure positioned on one of the three concentric circles closest to the center of the core region and having a first cross-sectional area, and a second microstructure positioned on the one of the three concentric circles closest to the center of the core region and having a second cross-sectional area smaller than the first cross-sectional area, the first microstructure and second microstructure being in line symmetry, the rest of the plurality of the microstructures, those not on the one of the three concentric circles closest to the center of the core region, having a cross-sectional area substantially equal to the second cross-sectional area; and a second cladding region that is formed in a layered structure around the first cladding region, the second cladding region including a homogeneous material, wherein a relative refractive-index difference $\Delta 1$ between the core region and the second cladding region is equal to or more than 0.4% and less than 1.0%, and the optical fiber has at least one place of bending with a curvature radius equal to or more than 3 millimeters and equal to or less than 60 millimeters.

* * * * *